Nov. 28, 1972 C. L. WILSON 3,704,142
COOKING PAN HAVING ARTICLE-SUPPORTING WALL ABOVE BOTTOM WALL
Filed Jan. 24, 1972
10 Sheets-Sheet 10
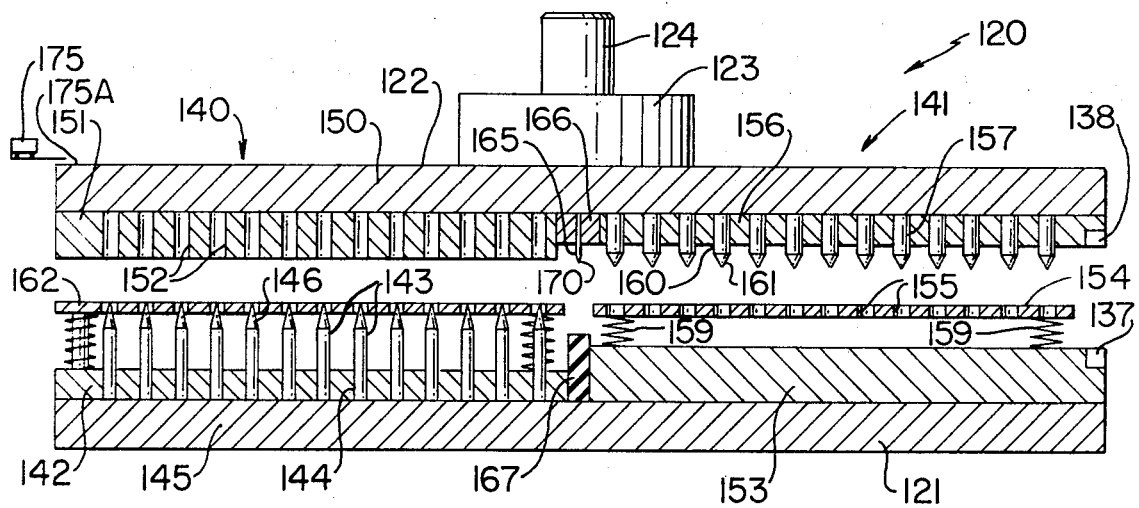

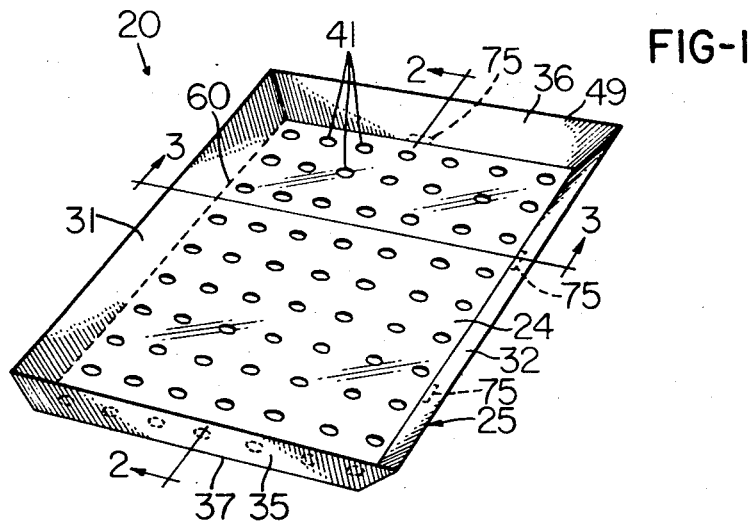
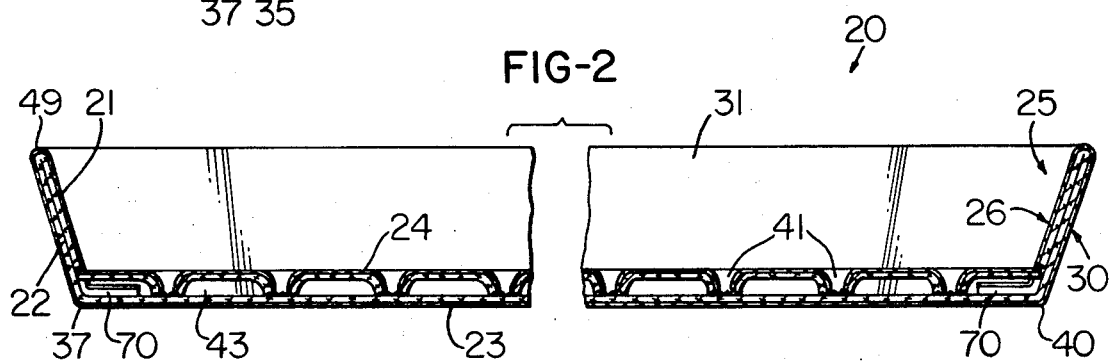
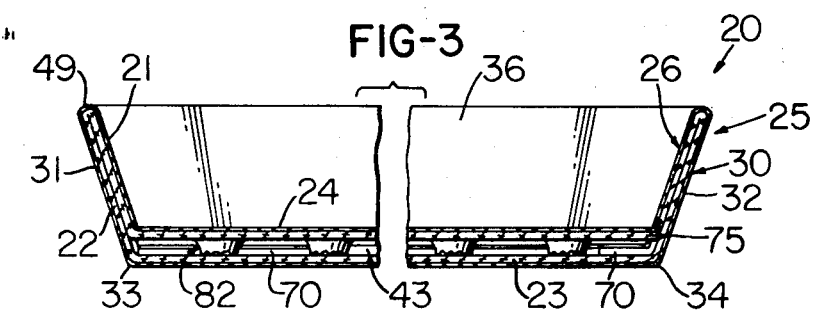
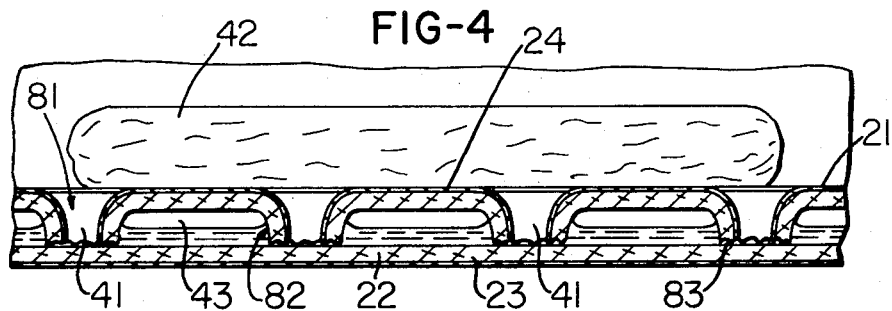

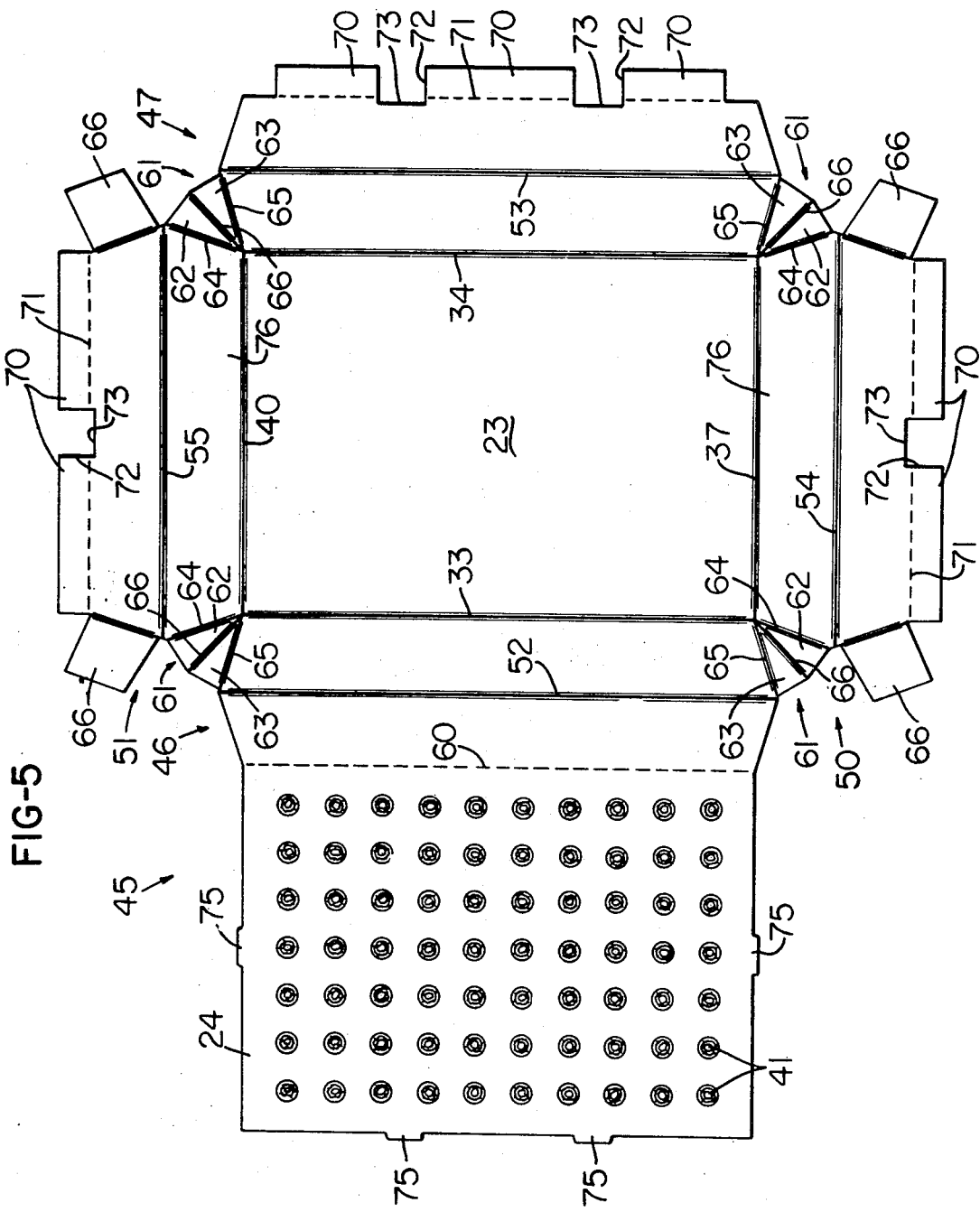

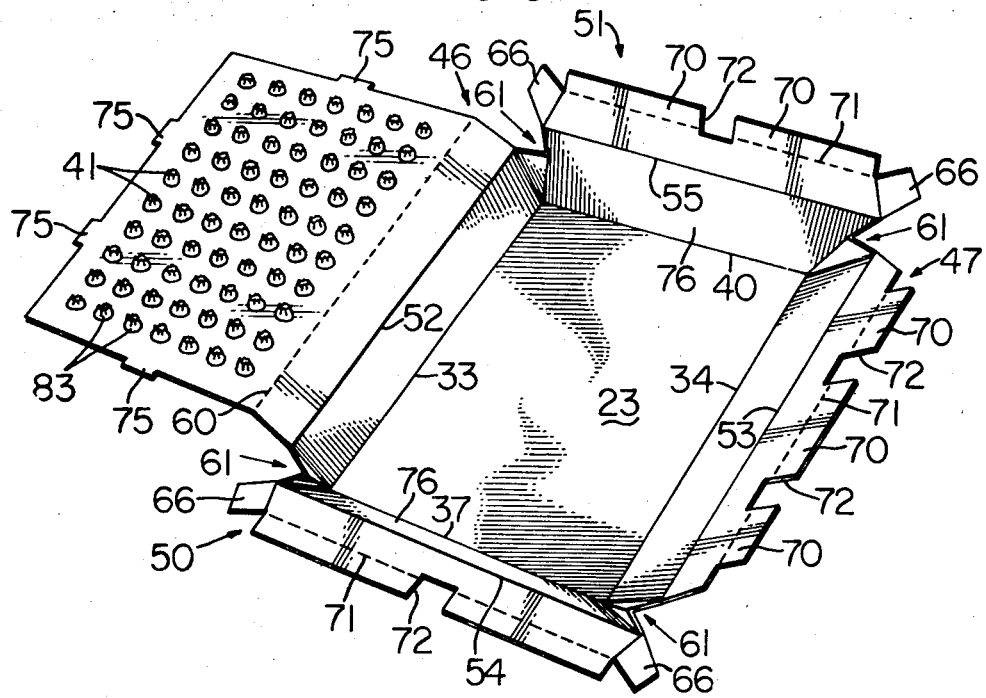
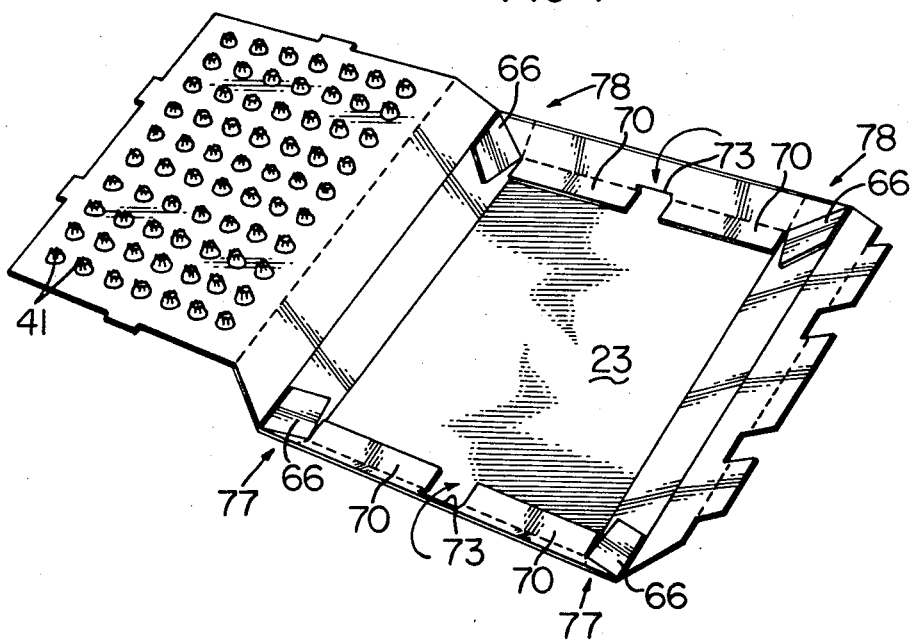

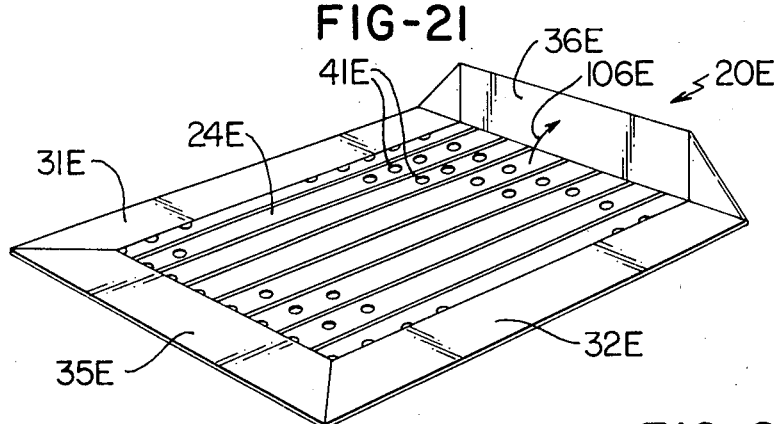
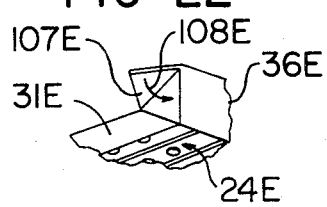
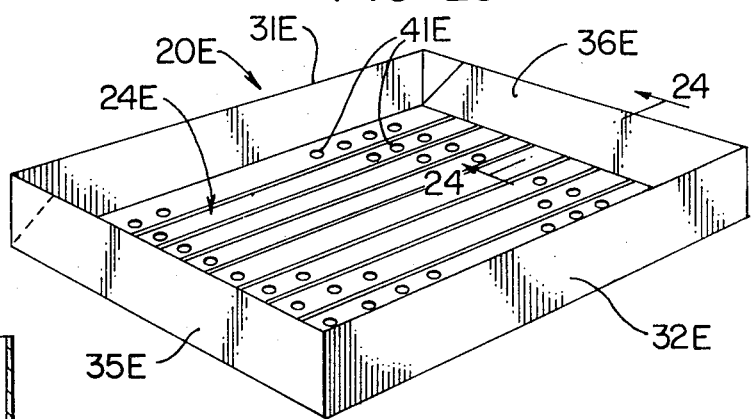
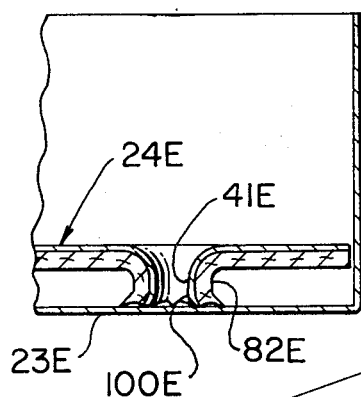
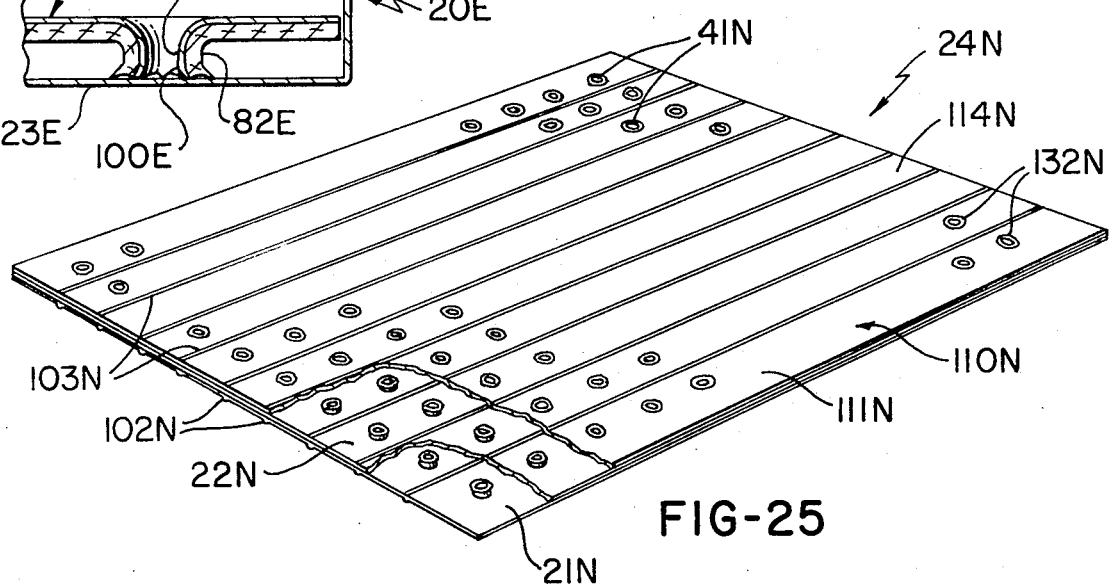

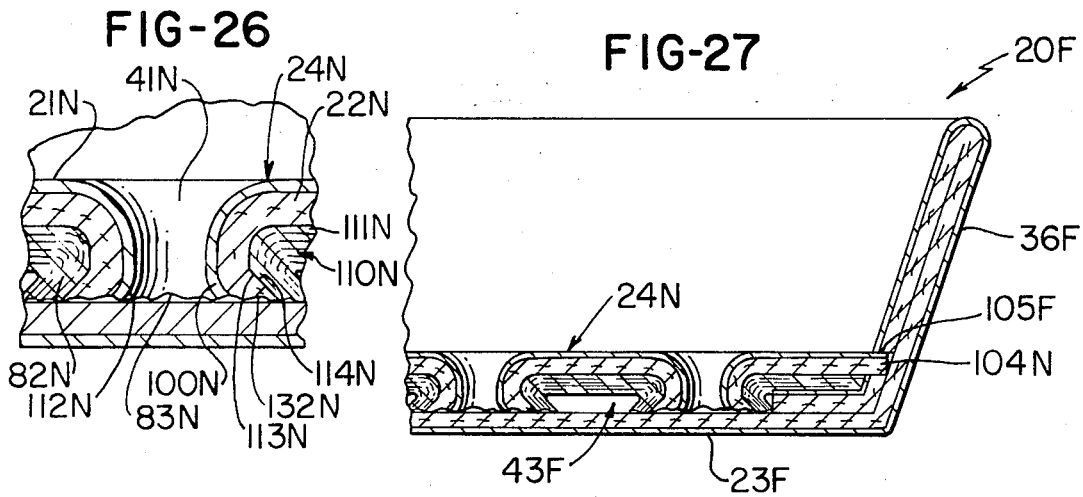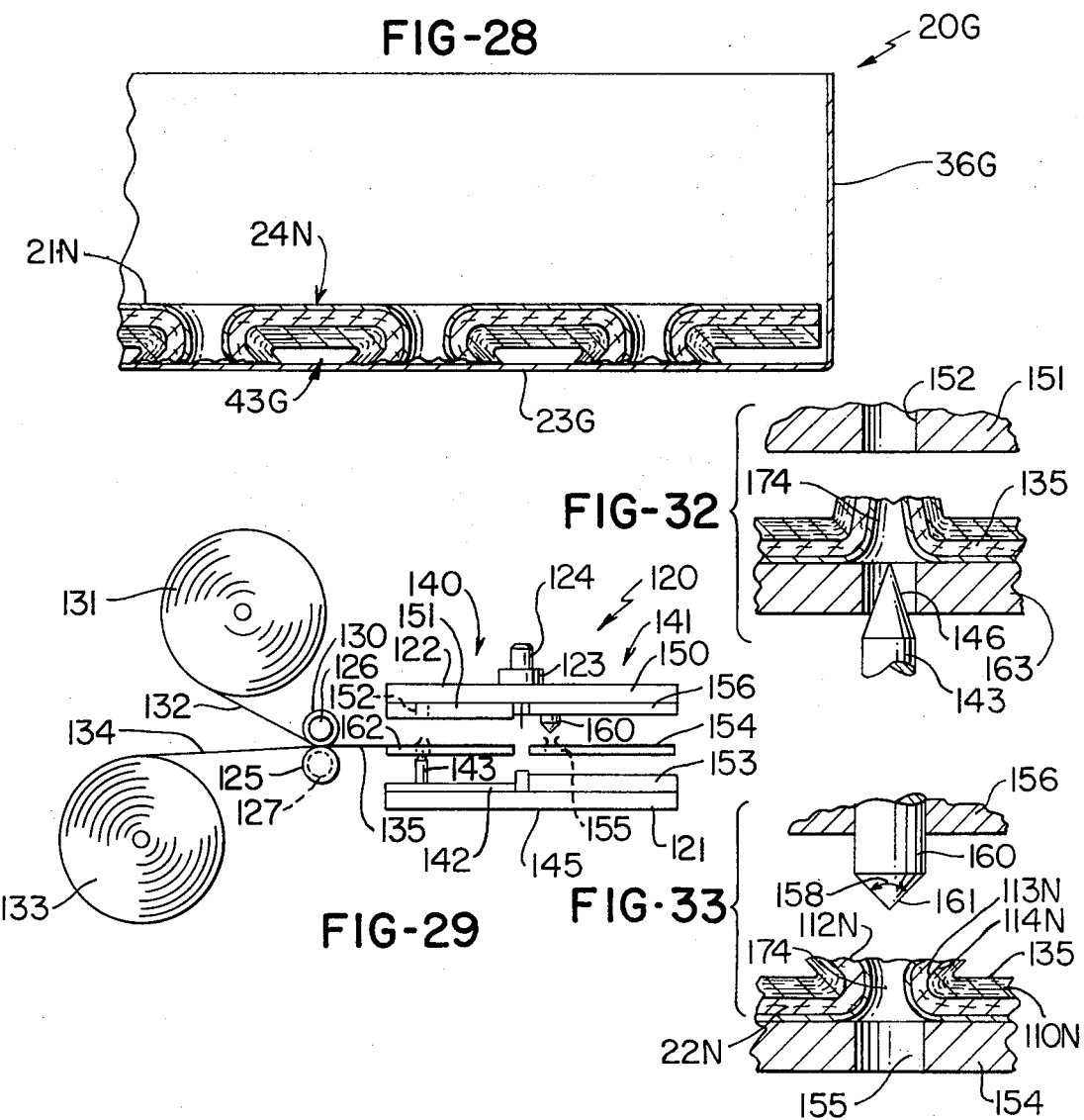

United States Patent Office 3,704,142
Patented Nov. 28, 1972

3,704,142
COOKING PAN HAVING ARTICLE-SUPPORTING
WALL ABOVE BOTTOM WALL
Calvin L. Wilson, Richmond, Va., assignor to Reynolds Metals Company, Richmond, Va.
Continuation-in-part of application Ser. No. 844,442, July 24, 1969. This application Jan. 24, 1972, Ser. No. 220,275
Int. Cl. A47j 36/20
U.S. Cl. 99—446                                15 Claims

ABSTRACT OF THE DISCLOSURE

A disposable cooking pan which is particularly adapted for broiling food products is provided and such pan has metallic foil defining practically its entire exposed inside and outside surfaces. The pan has an article-supporting wall arranged above a bottom wall with a space provided therebetween for collecting juice, or the like, exuding from a product contained in the pan and the article-supporting wall has means for absorbing such juice. An improved apparatus for and method of making the article-supporting wall are also presented herein.

CROSS REFERENCE TO RELATED APPLICATION

This application is a continuation-in-part of application Ser. No. 844,442, filed July 24, 1969 now Pat. No. 3,640,209.

BACKGROUND OF THE INVENTION

Disposable cooking pans, such as broiling pans, for example, have been proposed heretofore; however, these previously proposed pans generally use comparatively large quantities of metal and are generally preformed which makes them not only very expensive because of the cost of the metal but also unnecessarily bulky to handle and store.

SUMMARY

This invention provides an improved disposable pan, and blank for making same, particularly adapted for broiling food products and wherein the pan has metallic foil defining practically its entire exposed inside and outside surfaces. The pan has an article-supporting wall arranged above a bottom wall thereof with space provided therebetween for collecting juice, or the like, exuding from a product contained in the pan and the article-supporting wall has means for absorbing such juice. This invention also provides an improved apparatus for and method of making such juice-absorbing article-supporting wall.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a perspective view illustrating one exemplary embodiment of the pan of this invention;

FIG. 2 is an enlarged cross-sectional view with parts broken away taken essentially on the line 2—2 of FIG. 1;

FIG. 3 is an enlarged cross-sectional view with parts broken away taken essentially on the line 3—3 of FIG. 1;

FIG. 4 is a greatly enlarged fragmentary cross-sectional view particularly illustrating a food product which is to be broiled resting on the top surface of an article-supporting wall comprising the pan of FIG. 1;

FIG. 5 is a plan view of an exemplary blank used to make the pan of FIG. 1;

FIGS. 6–9 illustrate a series of exemplary steps used to fold the blank of FIG. 5 to define the pan of FIG. 1 which has its walls suitably held together in an interlocked manner without requiring separate or independent fastening means;

FIG. 16 is a fragmentary cross-sectional view illustrating still another exemplary embodiment of a pan of this invention which has an article-supporting wall which is free of openings, or the like;

FIG. 21 is a perspective view illustrating the manner in which one of the peripheral walls of the container comprising the pan of FIG. 20 may be readily erected by raising its oppositely arranged end walls and side walls;

FIG. 22 is a fragmentary perspective view particularly illustrating the construction of a gusset which is typical of the gussets provided in each corner of the container of FIG. 20;

FIG. 23 is a perspective view illustrating the container of FIG. 20 in its fully erected or assembled condition and showing the article-supporting wall in position;

FIG. 24 is an enlarged view taken on the line 24—24 of FIG. 23;

FIG. 25 is a perspective view, with parts broken away, illustrating another exemplary embodiment of an article-supporting wall which is shown in an inverted position and such article-supporting wall is comprised of a layer of metallic foil, a structural layer of paperboard, and an absorbent layer of paper tissue;

FIG. 26 is an enlarged fragmentary cross-sectional view showing a portion of the article-supporting wall of FIG. 25 supported in position on an associated bottom wall;

FIG. 27 illustrates another exemplary embodiment of the pan of this invention which utilizes an outer container which is substantially identical to the outer container of FIG. 17 and an article-supporting wall which is similar to the article-supporting wall of FIG. 25;

FIG. 28 is a view similar to FIG. 27 illustrating another exemplary embodiment of the pan of this invention which utilizes an article-supporting wall which is similar to the article-supporting wall of FIG. 25 and an outer container which is substantially identical to the outer container illustrated in FIG. 23;

FIG. 29 is a schematic view illustrating one exemplary embodiment of an apparatus and method which may be used to make the article-supporting wall illustrated in FIG. 25;

FIG. 30 is a side elevation with certain parts in cross section of the die assembly comprising the apparatus of FIG. 29;

FIG. 31 is an end view of the apparatus of FIG. 30;

FIG. 32 is an enlarged fragmentary view showing a typical piercing pin and a fragment of its associated backup plate which has a cooperating opening therein for the piercing pin which comprise the apparatus of FIG. 29 and also showing the pierced opening defined by such pin and its backup plate in an associated construction defined by a plurality of webs or layers of material;

FIG. 33 is an enlarged view similar to FIG. 32 showing a typical riveting pin and a fragment of its backup plate which has a cooperating opening therein for the riveting pin and also showing the appearance of the construction once its component webs have been riveted together;

FIG. 34 is a schematic view similar to the forward portion of FIG. 29 illustrating a modification of the apparatus and method of this invention;

FIG. 35 is a schematic view illustrating another exemplary embodiment of an apparatus and method which may be used to make the article-supporting wall illustrated in FIG. 25; and FIG. 36 is an enlarged view particularly showing the manner in which the combined webs of material which are to be attached or laminated together to define a construction are held against the backup roll of the piercing apparatus.

DESCRIPTION OF ILLUSTRATED EMBODIMENTS

Figure 8:
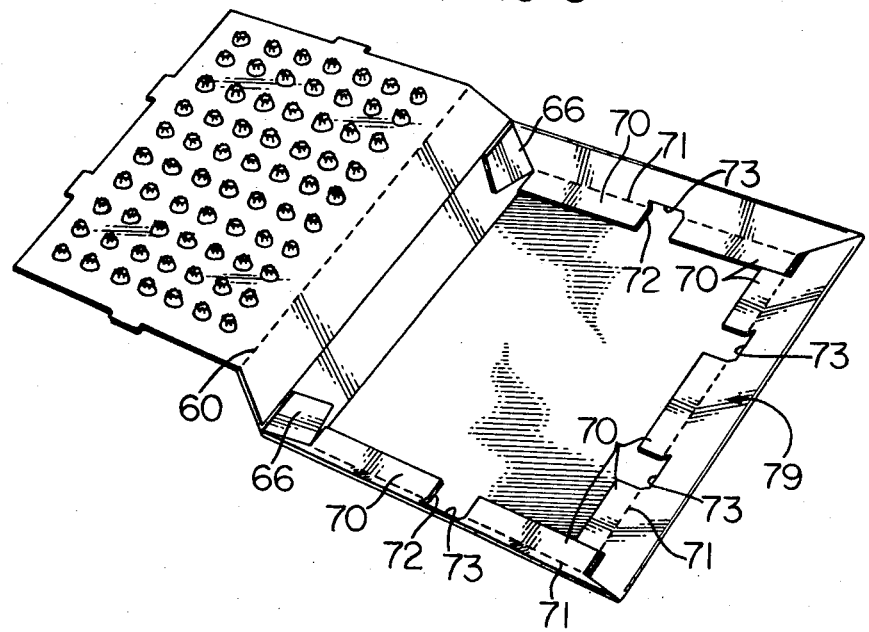
Figure 9:
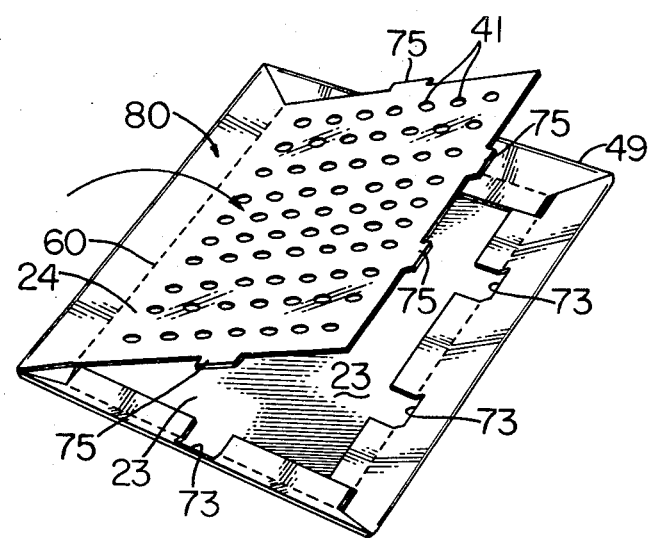

Reference is now made to FIG. 1 of the drawings wherein a cooking pan 20 is illustrated which is particularly adapted for broiling food products and particularly food products such as sausage, bacon, hamburgers, or the like, which exude substantial quantities of liquids such as moisture, fat, and the like, during broiling, and such liquids will be referred to generally as juice or juices. The pan 20 is of simple and economical construction and is made of a laminate defined by a layer of metallic foil 21 and a layer of a comparatively inexpensive nonmetallic structural material such as a fibrous paper layer 22. The paper layer may be of the type which is heat resistant and has high strength when wet or loaded with liquids or juices for reasons which will be apparent later in this specification.

The pan 20 has a bottom wall 23 which has its metallic foil layer 21 defining the outside or exposed surface thereof and an article-supporting wall 24 having its metallic foil layer defining its supporting surface. The pan 20 also has a peripheral wall construction designated generally by the reference numeral 25 which adjoins the peripheral edge of the bottom wall 23 and the peripheral wall construction 25 is defined by two layers of laminated material arranged so that metallic foil 21 defines both the inside and the outside surface of the peripheral wall construction 25 and as illustrated at 26 and 30, in FIGS. 2 and 3, respectively.

The peripheral wall construction 25 is comprised of a pair of side walls 31 and 32 foldably connected along fold lines 33 and 34 respectively defining opposite side edges of the bottom wall 23 and a pair of end walls 35 and 36 foldably connected along fold lines 37 and 40 respectively defining opposite end edges of the bottom wall 23. The article-supporting wall 24 has a plurality of spaced openings 41 provided therein which allow juice, such as fat, exuding from a food product and shown in FIG. 4 as a piece of sausage 42, to flow into a controlled space 43 defined by spacing the article-supporting wall 24 above the bottom wall 23. The space 43 provides a substantially sheltered reservoir for the fat exuding from the sausage enabling efficient and safe broiling with minimum likelihood of igniting such fat.

As will be readily apparent from FIGS. 1–4 of the drawings, the pan 20 is constructed so that it is only necessary to laminate metallic foil on one side of an inexpensive paper layer 22. The pan is constructed so that practically its entire exposed inside and outside surfaces are defined by metallic foil with the comparatively inexpensive paper layer providing structural strength for the pan. Thus, the paper layer is protected, under most ordinary cooking conditions, against burning or charring by the metallic foil yet a comparatively strong and inexpensive pan is provided which is very simple to manufacture.

The pan 20 may be made in any suitable manner; and, in this exemplary embodiment is made from a single piece blank 45 illustrated in FIG. 5 of the drawings and the blank 45 is of a two-ply construction defined by paper layer 22 and metallic foil layer 21. The blank 45 is suitably cut and scored so that it may be easily assembled and its various walls are held together in an interlocking manner independent of separate means such as fasteners, adhesive, and the like, and in a manner which will be readily understood from viewing FIGS. 5–9 of the drawings. Further, the blank 45 is positioned with its paper layer facing upwardly, as shown in FIG. 5, making it easy to assemble so that the resulting assembled pan 20 has metallic foil defining its entire inside and outside surfaces. The metallic foil 21 comprising the blank 45 is preferably a metallic foil containing aluminum. Further, such foil may be suitably imprinted, embossed, or kept plain, as desired. It will also be appreciated that the previously described openings 41 may be formed in the blank and such openings are in the form of punched openings for reasons which will be explained in detail subsequently.

The blank 45 has a pair of side flaps 46 and 47 foldably connected to opposite side edges of the bottom wall 23 along the fold lines 33 and 34 respectively and has a pair of end flaps 50 and 51 foldably connected to opposite end edges of the bottom wall 23 along fold lines 37 and 40 respectively. The side flaps 46 and 47 are adapted to be folded substantially in half along fold lines 52 and 53 respectively to define associated side walls 31 and 32 of pan 20. Similarly the end flaps 50 and 51 are adapted to be folded substantially in half along fold lines 54 and 55 respectively to define associated end walls 35 and 36 of the resulting pan 20. The folding of flaps 46, 47, 50, and 51 substantially in half defines a top edge 49 of outwardly convex configuration for the entire peripheral wall 25 and the outer surface of such top edge is made of metallic foil 21.

An extension of substantially rectangular configuration is provided extending from one of the flaps and in this example such extension extends beyond a weakened line 60, which may be in the form of a cut-score line, defining the terminal outer end of the flap 46. As seen particularly in FIG. 9, the extension is folded above and parallel to the bottom wall 23 to define the article-supporting wall 24 and hence such extension will also be designated by the reference numeral 24.

The blank has a plurality of substantially identical integral gussets each designated generally by the reference numeral 61 and comprised of a pair of adjoining triangular portions 62 and 63. Each integral gusset is foldably connected between the lower edge portions of each associated end flap and each associated side flap along typical fold lines as indicated at 64 and 65 respectively. Each gusset 61 is particularly adapted to be bifolded along a fold line 66 and the fold line 66 defines a common side for the triangular portions 62 and 63.

Each end flap 50 and 51 has a pair of holding flaps 66 extending from opposite ends thereof and each flap 47, 50, and 51 has a plurality of tabs 70 extending beyond an associated interrupted weakened line 71 defining the terminal outer edge of each flap 47, 50, and 51 respectively. Each flap 47, 50, and 51 also has at least one rectangular cutout 72 provided therein and each cutout 72 extends inwardly in its associated flap and has a base portion 73 which is arranged parallel to its associated weakened line 71 and inwardly thereof.

The extension 24 extending outwardly of flap 46 also has a plurality of locking tabs 75 and upon folding the blank 45 to define the resulting pan 20 each locking tab 75 is received within an associated cutout 72 with the top surface of each locking tab 75 held beneath an associated base portion or inner edge 73. Thus, once the blank 45 is assembled in the manner illustrated in FIGS. 6–9 of the drawings the resulting pan 20 is held together in a high strength manner without requiring separate or independent fastening means.

The blank 45 is assembled with simplicity by bifolding each gusset 61 along its associated fold line 66 and arranging each gusset substantially coplanar with the lower half 76 of an associated end flap, see FIG. 6.

The outer half of each end flap 50 and 51 is then folded against its associated bifolded gussets 61 as indicated at 77 and 78 respectively in FIG. 7 and each holding flap 66 is arranged substantially coplanar with the lower or inner half of an associated side wall flap, either 46 or 47. The outer half of flap 47 is folded in position against its associated pair of holding flaps 66 as illustrated at 79 in FIG. 8, and the outer half of flap 46 is then folded in position against its associated pair of holding flaps 66 as illustrated at 80 in FIG. 9, whereupon the outer halves of flaps 46, 47, 50, and 51 are then held in position by the extension or article-supporting wall 24 of pan 20 which is foldably connected to the outer half of flap 46 along weakened line 60. It will also be noted from FIGS. 7–9 of the drawings that the tabs 70 extending from flaps 47, 50, and 51 are folded substantially coplanar with bottom wall 23 and upon folding extension 24 in position the locking tabs 75 look beneath edges 73 to hold the blank 45 together in an interlocked high strength manner.

From the above description it will be appreciated that the blank 45 may be shipped and stored in its flat form and then simply and easily erected in a manner illustrated in FIGS. 6–9 of the drawings whereby the broiling pan 20 defined from blank 45 has not only the advantage of being made from comparatively inexpensive materials but also has the added advantage of being capable of being erected from a flattened form without requiring separate fastening means. However, it will be appreciated that, if desired, separate fastening means may be used to fasten the associated flaps in position to define the broiling pan 20.

The openings 41 provided in the extension 24 and hence in the article-supporting wall 24 of pan 20 are in the form of punched openings which are punched using any suitable tool so that the punching action is provided in a direction generally from the foil layer 21 toward the paper layer 22. The punching action causes the upper portion of each opening 41 to be lined with metallic foil and be provided with an arcuate configuration as seen at 81 in FIG. 4 for a typical opening 41. The punching action also defines a substantially tubular column 82 of roughly two-ply construction around each opening 41 and each column 82 defines integral means spacing the article-supporting wall 24 above the bottom wall 23 to define the previously mentioned controlled space 43 therebetween.

The punching action also causes the columns 82 to have jagged lower edges of paper as indicated at 83 and the jagged lower edges in essence provide a wicking action which helps absorb juice exuding from a food product, such as sausage 42, during broiling thereof, for example. As previously mentioned, the paper layer 22 is preferably of a type which has high strength even when saturated with moisture, juice, etc., whereby the disposable broiling pan 20 retains its structural strength and rigidity and assures trouble-free broiling.

Thus, it is seen that the punched openings 41 define columns 82 which in essence define spacing means which space and support the article-supporting wall 24 above the bottom wall 23. Further, the punching action provides a smooth inlet into each opening 41 which is effectively lined with metallic foil so as to shield the paper layer 22 against burning or charring, and also forms jagged edges 83 which provide a wicking or absorbing action for juices, and the like, exuding from a product contained or being cooked in the pan 20.

Figure 10:
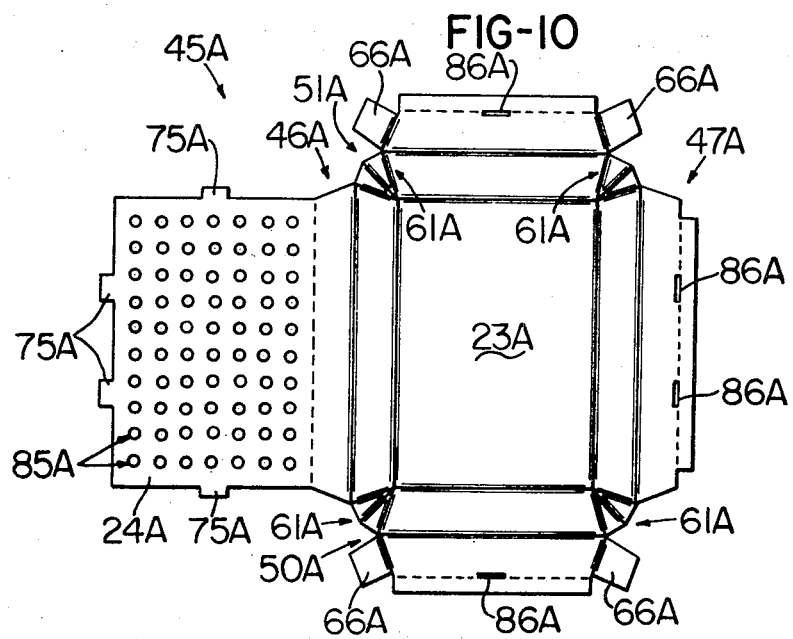
FIG. 10 is a plan view of another exemplary blank similar to the blank of FIG. 5 which is adapted to be assembled to define another exemplary embodiment of disposable broiling pan.
Figure 11:
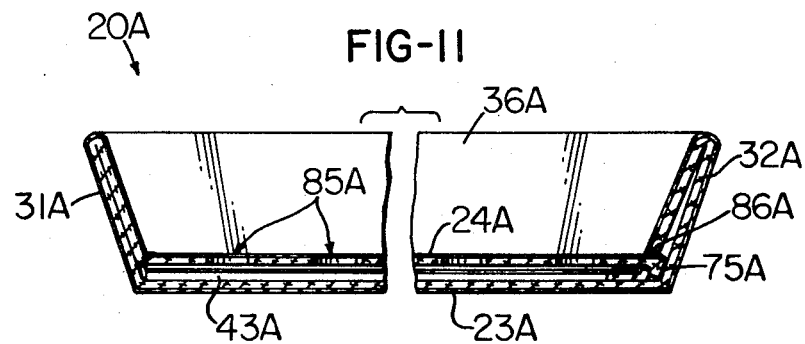
FIG. 11 is a fragmentary cross-sectional view similar to FIG. 3 and illustrating a pan made from the blank of FIG. 10.

Another exemplary embodiment of this invention is illustrated in FIGS. 10 and 11 of the drawings which illustrate respectively a blank and a resulting pan made from such blank. The blank and pan illustrated in FIGS. 10 and 11 are very similar to the blank 45 and pan 20; therefore, such blank and pan will be designated generally by the reference numerals 45A and 20A respectively and parts thereof which are very similar to corresponding parts of the blank 45 and the pan 20 will be designated by the same numeral as in the blank 45 and pan 20 also followed by the letter designation "A" and not described again. Only those component parts which are substantially different from corresponding parts of the blank 45 and pan 20 will be designated by new reference numerals also followed by the letter designation "A" and described in detail.

The main difference between the blank 45A and the blank 45 is that the blank 45A has openings in its extension 24A which are not punched but severed clear through in a clean manner and as illustrated at 85A in FIG. 11. In addition, it will be noted that the cutouts provided in each flap 47A, 50A, and 51A are in the form of cutout openings of rectangular outline and each is designated by the reference numeral 86A. In the assembled pan 20A each locking tab 75A extending from extension 24A is received within an associated cutout 86A and serves to space such extension or article-supporting wall 24A above the bottom wall 23A to define the controlled space 43A therebetween.

Figure 12:
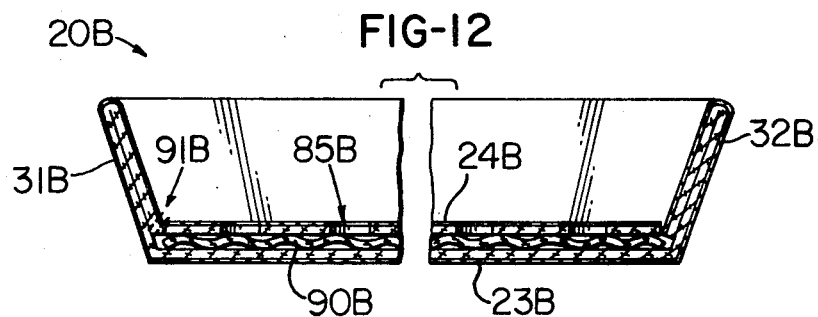
FIG. 12 is a fragmentary cross-sectional view similar to FIG. 3 and illustrating another exemplary embodiment of a broiling pan of this invention having separate spacing means provided between its bottom wall and its article-supporting wall.

Reference is now made to FIG. 12 of the drawings which illustrates another exemplary embodiment of a pan which is similar to the pan 20A and is designated generally by the reference numeral 20B. The pan 20B may be formed from a blank substantially identical to the blank 45A with the exception that the tabs 75A and cutouts 86A may be eliminated; therefore, the pan 20B has separate spacing means in the form of a separate spacer 90B of undulating configuration arranged between bottom wall 23B and article-supporting wall 24B. The spacer 90B may, if desired, be made of a heat resistant material and may also have absorbing qualities so that it will readily absorb juice exuding from an associated product contained in the pan 20B.

It will also be appreciated that the article-supporting wall 24B may be provided in the pan 20B as a separate member and in this latter instance it would be free or detched from flap 46, as indicated by dotted lines at 91B in FIG. 12, as well as being detached from the remaining walls of pan 20B. Upon using spacer 90B with a separate or detached article-supporting wall such spacer provides the sole support for the article-supporting wall 24B as well as the required spacing function.

Figure 13:
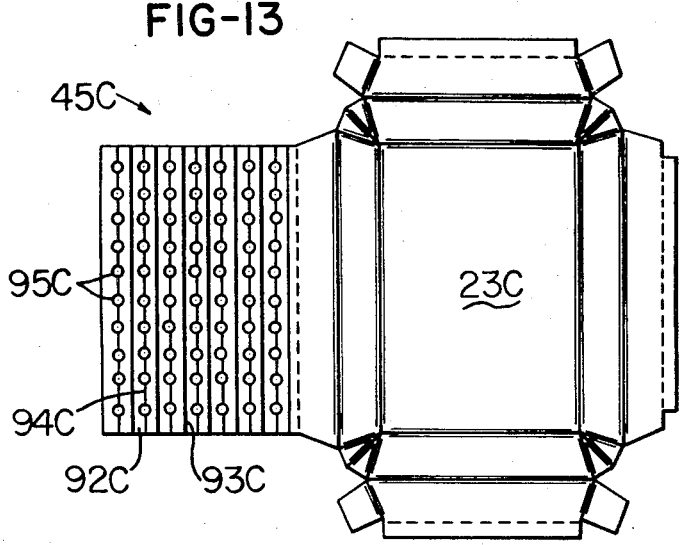
FIG. 13 is a plan view of another exemplary blank which is particularly adapted to be folded to define another exemplary embodiment of a disposable broiling pan.
Figure 14:
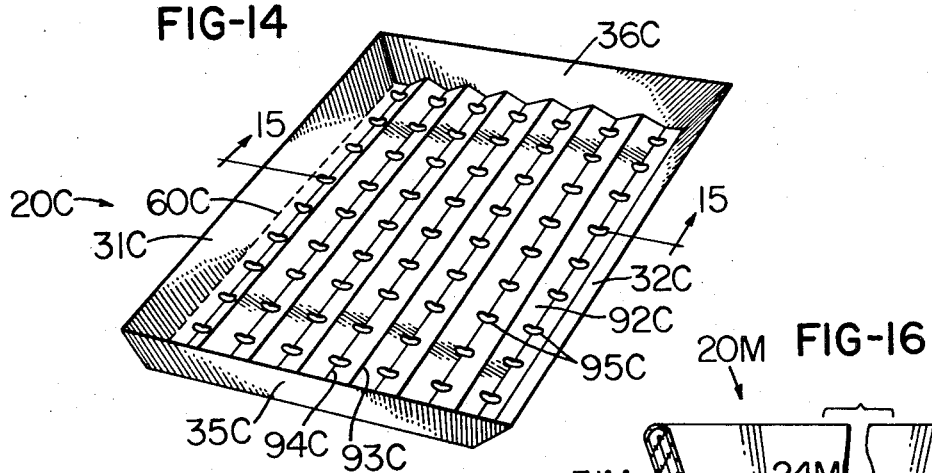
FIG. 14 is a perspective view illustrating a disposable broiling pan formed upon assembling the blank of FIG. 13.
Figure 15:
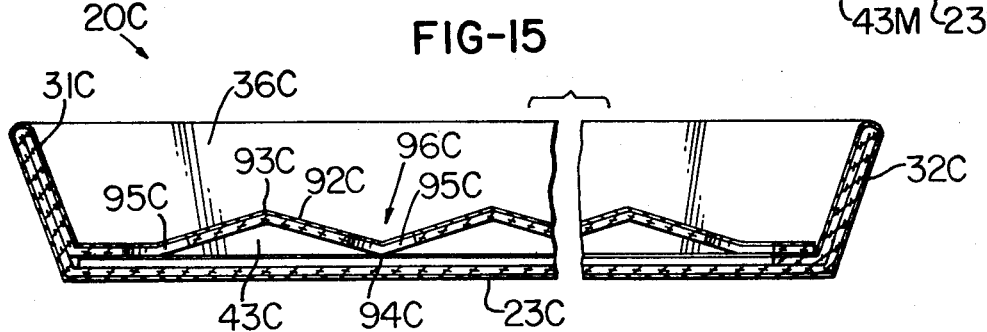
FIG. 15 is an enlarged framgentary cross-sectional view taken on the line 15—15 of FIG. 14.

Another exemplary embodiment of this invention is illustrated in FIGS. 13–15 of the drawings. The blank and resulting pan illustrated in FIGS. 13–15 are very similar to the blank 45 and pan 20; therefore, such blank and pan will be designated generally by the reference numerals 45C and 20C respectively and parts of the blank 45C and pan 20C which are very similar to corresponding parts of the blank 45 and pan 20 respectively will be designated by the same reference numerals as previously also followed by the letter designation "C" and not described again. As previously, only those component parts which are different from corresponding parts of the blank 45 and pan 20 will be designated by a new reference numeral also followed by the letter designation "C" and described in detail.

The blank 45C has an extension 92C which defines an article-supporting wall in the assembled pan 20C which is also designated by the reference numeral 92C and extension 92C has an undulating or roughly sinusoidal configuration which is characterized by sharp upper and lower ridges as indicated at 93C and 94C respectively in FIG. 15. Blank 45C also has openings 95C which are cut clear through the foil layer 21 and the paper layer 22 and the openings are provided so that the article-supporting wall 92C has the openings provided in the bottom portion of each downwardly extending wave or ridge 94C and as indicated at 96C. The openings 95C allow juice from a product contained in pan 20C to flow in the space 43C.

The undulating configuration of the article-supporting wall 92C provides added strength and rigidity for such wall in a manner which is well known in the art. In addition, it will be appreciated that such undulating configuration in essence defines integral spacing means for wall 92C and hence controlled space 43C between the article-supporting wall 92C and the bottom wall 23C. The undulating configuration and openings 95C may be formed in extension 92C of blank 45C using known techniques and with the remaider of the blank kept in its flat form; further, the height and shape of the ridges may be changed as desired.

It will also be appreciated in connection with the blank 45C and the resulting pan 20C that it is not necessary to provide tabs extending from extension 92C which are similar to the tabs 75 of extension 24 in blank 45. Further, it is not necessary to provide cutouts corresponding to cutouts 72 of the blank 45.

Figure 16:
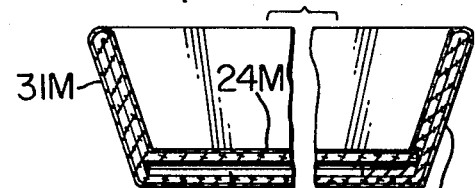

A modification of the pan 20 is illustrated in FIG. 16 of the drawings and designated by the reference numeral 20M. The pan illustrated in FIG. 16 is substantially identical to the pan 20 and hence will be designated generally by the reference numeral 20M. The main difference between the pan 20M and the pan 20 is that the pan 20M is not provided with openings in its article-supporting wall 24M. In those instances where it is desired to use the pan 20M as a broiling pan it is a simple matter to provide the length of the article-supporting wall in the direction parallel to its side walls 31M and 32M so that it is shorter than such side walls whereupon juice may flow around the ends of article-supporting wall 24M into the space 43M beneath such article-supporting wall.

The pan 20M may be used as a baking pan or for other suitable purposes where it is not desired to provide openings in the article-supporting wall 24M; yet, it will be appreciated that pan 20M is of simple and economical construction, is made from a single piece blank, and utilizes a minimum amount of metallic foil bonded to a comparatively inexpensive layer of paper to provide the required strength and rigidity for such pan.

If desired, each pan 20, 20C and 20M may also have its associated article-supporting wall provided either as an integral part of its associated walls or as a separate member and as described in connection with wall 24B of the pan 20B.

Figure 17:
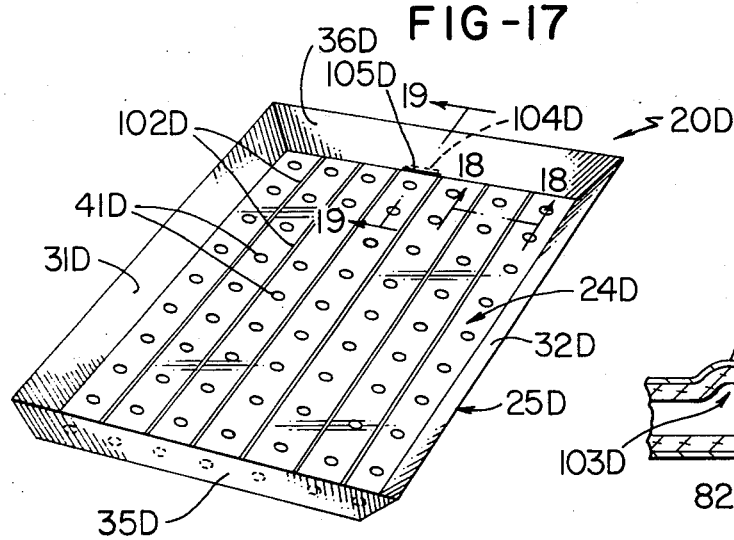
FIG. 17 is a perspective view similar to FIG. 1 illustrating another exemplary embodiment of the pan of this invention which has an article-supporting wall which may be readily detached from the remainder of the pan and is merely held in position by a pair of integral tabs arranged at opposite ends thereof.
Figure 18:
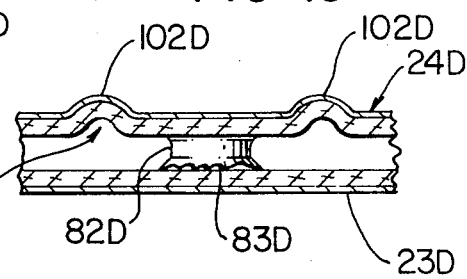
FIG. 18 is an enlarged cross-sectional view taken on the line 18—18 of FIG. 17.
Figure 19:
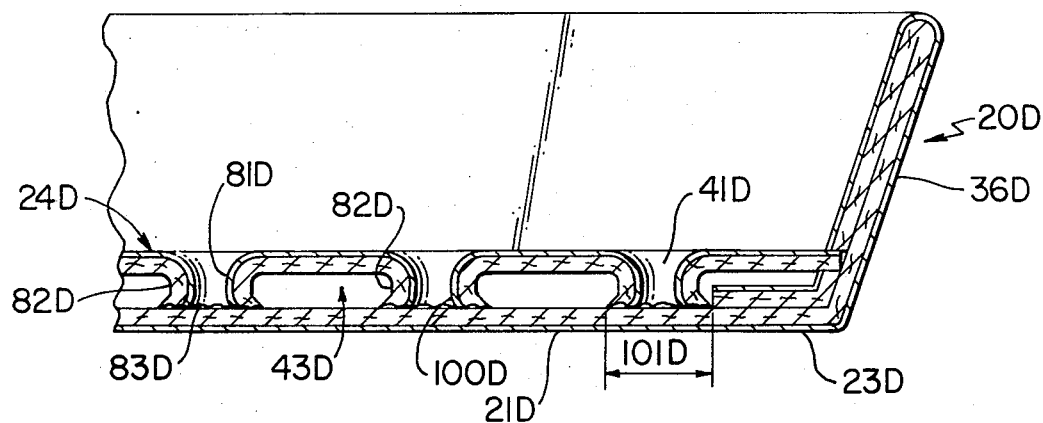
FIG. 19 is an enlarged cross-sectional view taken on the line 19—19 of FIG. 17.

Another exemplary embodiment of this invention is illustrated in FIGS. 17–19 of the drawings which illustrate a pan which is similar to the pan 20; therefore, such pan will be designated generally by the reference numeral 20D and parts thereof which are similar to corresponding parts of the pan 20 will be designated by the same reference numeral as in the pan 20 also followed by the letter designation "D" and not described again. Only those component parts which are substantially different from corresponding parts of the pan 20 will be designated by a new reference numeral also followed by the letter designation "D" and described in detail.

The main differences between the pan 20D and the pan 20 are that the pan 20D has an article-supporting wall 24D which may be readily detached from the remainder of the pan 20D and, hence, is provided as a separate unit; also, the article-supporting wall 24D has integral spacing means in the form of tubular columns 82D of improved construction. In particular, each column 82D in addition to having jagged lower paper edges 83D, has a downwardly flaring bottom portion 100D, see FIG. 19.

The pan 20D has a bottom wall 23D which has its metallic foil layer 21D defining the outside or bottom surface thereof and a peripheral wall construction 25D comprised of a pair of side walls 31D and 32D foldably connected along fold lines defining opposite side edges of the bottom wall 23D and a pair of end walls 35D and 36D foldably connected along fold lines defining opposite end edges of such bottom wall. The pan 20D has an article-supporting wall 24D which has a plurality of punched openings 41D provided therein and in a manner to be described in detail subsequently. The openings 41D allow juice, and the like, to flow in the controlled space 43D between the article-supporting wall 24D and the bottom wall 23D. The openings 41D have upper portions thereof substantially lined by metallic foil and as seen at 81D and this metallic foil protects the nonmetallic layers arranged therebeneath against burning.

The openings 41D are bounded by roughly tubular columns 82D formed by the punching action and the columns 82D define integral means which are adapted to space the article-supporting wall 24D above the bottom wall 23D and, as previously mentioned, each tubular column 82D has a downwardly flaring bottom portion 100D. The downwardly flaring portion 100D of each column 82D defines a comparatively large-supporting base therefor having an approximate diameter indicated at 101D and the large diameter base is larger than the base of columns 82 comprising pan 20 which are punched through and not flared. The columns 82D with their large supporting bases are adapted to space the article-supporting wall 24D above the bottom wall 23D with optimum stability and assure the provision of the controlled space 43D.

The article-supporting wall 24D of this exemplary embodiment of the invention also has a plurality of spaced parallel projections or ridges 102D extending upwardly from its main planar surface, see FIG. 18, and these ridges are preferably provided by indenting the entire thickness of the article-supporting wall 24D utilizing a suitable conventional scoring device not shown. The scoring device defines a corresponding indentation 103D in the article-supporting wall 24D. The ridges 102D and indentations increase the strength of the article-supporting wall 24D against loads applied substantially normal to its main planar surface and tending to bend the ridges 102D yet do not adversely affect its strength against loads tending to bend such wall along lines roughly parallel to such ridges. The ridges 102D also serve to raise a product slightly above the main portion of the article-supporting wall 24D to allow juices exuding from such product to reach the openings 41D in an easier manner.

The article-supporting wall 24D also has a pair of tabs 104D extending from its opposite ends and each tab 104D is inserted within an associated slot 105D provided in an associated end wall, either 35D or 36D of the pan 20D. The tabs 104D are used primarily to prevent the wall 24D from becoming separated from the rest of the pan 20D during transportation and storage but also help define the controlled space 43D.

Another exemplary embodiment of this invention is illustrated in FIGS. 20–24 of the drawings. The pan illustrated in FIGS. 20–24 of the drawings is very similar to the pan 20D; therefore, such pan will be designated generally by the reference numeral 20E and parts thereof which are similar to corresponding parts of the pan 20D will also be designated by the same reference numeral as in the pan 20D also followed by the letter designation "E" instead of "D" and not described again.

The main differences between the pan 20E, see FIGS. 23 and 24, and the pan 20D are that the article-supporting wall 24E has a rectangular configuration minus any tabs. In addition, the outer tray-like container portion of pan 20E is made of a single thickness of metallic foil, preferably aluminum foil, which has a rectangular configuration prior to folding thereof.

Figure 20:
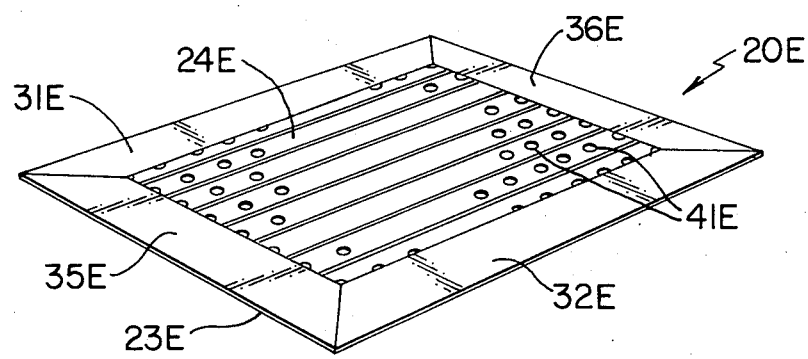
FIG. 20 is a perspective view illustrating another exemplary embodiment of the pan of this invention which is comprised of an outer container made of a single thickness of metallic foil which is used in combination with an improved article-supporting wall.

The outer tray-like container of pan 20E is readily collapsed substantially into a single plane, as illustrated in FIG. 20, merely by supporting the article supporting wall 24E on the bottom wall 23E thereof and then folding the side walls 31E–32E and end walls 35E–36E into position against the top surface of the article-supporting wall 24E whereby such pan may be transported and stored in a minimum of space. The pan 20E is readily erected or assembled for use merely by lifting each end wall upwardly as indicated in FIG. 21 by the arrow 106E for the end wall 36E. The end walls 35E and 36E may be lifted either individually in a serial manner or simultaneously whereupon the side walls 31E and 32E are then lifted in a similar manner to define the completed pan 20E illustrated in FIG. 23.

The tray-like outer container of the pan 20E is preferably prefolded into the flattened condition of FIG. 20 using a suitable folding machine and, as previously mentioned, using a rectangular sheet of metallic foil. The folding is achieved so that a pair of triangular gusset-like portions 107E are defined in each corner and folded against an associated end wall, as indicated by the arrow 108E whereupon portions 107E and its adjoining end wall are folded flatly against an associated side wall which has been previously folded against the top surface of the article-supporting wall 24E, see FIG. 22.

The pan 20E may be placed on the oven racks of a conventional range and used as a roasting pan, broiling pan, etc., without providing any additional support therefor and the gage thickness of the metallic woil is suitably selected so that it will not be easily ruptured. However, it will be appreciated that the pan 20E may be placed on a suitable support such as a conventional cookie sheet, for example, if the cook desires to move the pan 20E in and out of the oven several times during cooking whereby the added support provided by such a cookie sheet enables easier handling.

As in the case of the pan 20D, the article supporting wall 24E of the pan 20E has a plurality of punched opening 41E extending therethrough and the punching action defines tubular columns 82E of roughly two-ply construction around each opening 41E. The columns 82E serve as integral means spacing the article supporting wall 24E above the bottom wall 23E while the outwardly flaring bottom portions 100E of such columns assure that the columns 82E do not collapse radially inwardly while providing larger supporting bases for the columns 82E.

Reference is now made to FIG. 25 of the drawings which illustrates another exemplary embodiment of an article-supporting wall which is designated generally by the reference numeral 24N and which may comprise the various embodiments of the unique cooking pan of this invention. The article-supporting wall 24N is comprised of a plurality of layers including an intermediate structural layer made of a comparatively inexpensive non-metallic structural material such as fibrous paper 22N, a top layer made of metallic foil 21N, and an absorbent layer 110N of a highly absorbent material such as tissue paper, or the like. When tissue paper is employed it may be creped to help increase its liquid retention qualities by entrapment of the liquids in addition to absorption. The absorbent layer may be a single thickness of absorbent material; however, in this example, the absorbent layer 110N is comprised of a plurality of six thicknesses or sheets 111N of highly absorbent tissue paper, see FIG. 26.

The three layers 21N, 22N, and 110N comprising the article supporting wall 24N may be attached together as a single unit to define a laminated construction using any suitable technique; however, the absorbent layer 110N is preferably held in position solely by portions of layers 21N and 22N which have in essence been "riveted" against layer 110N, see FIG. 26. In particular, the article-supporting wall 24N has a plurality of openings 41N extending therethrough which are defined by punching and in a manner to be described in detail subsequently whereby the punching action and subsequent riveting action causes the lower or bottom portions 100N of the tubular columns 82N to flare downwardly and the riveting defines an enlargement 112N in the bottom portion of each opening 41N. This riveting action also causes parts of the structural layer 22N comprising each column 82N to be folded back in a head-like manner so that an annular edge 113N is compressed or riveted against an associated flared annular portion 114N of the absorbent layer 110N causing the absorbent layer to be held in position against the bottom surface of the structural layer of paperboard 22N in what could be described as a riveted manner. The absorbent layer 110N is riveted in position at a plurality of locations corresponding in number to the number of openings 41N provided in the article-supporting wall 24N. Thus, the article-supporting wall 24N has integral columnar supporting means in the form of columns 82N having large supporting bases which assure the article-supporting wall is supported with optimum stability while defining a controlled space between the article-supporting wall and the bottom wall of its associated pan. Further, the absorbent layer 110N absorbs juices which flow through the openings 41N and cooperates with the structural paperboard layer 22N with the wicking action provided by its jagged edges 83N to assure that most of the juices exuding from an article supported on the article-supporting wall are absorbed.

The article-supporting wall 24N also has a plurality of spaced parallel projections or ridges 102N extending upwardly from its top surface (downwardly in the inverted wall shown in FIG. 25) and corresponding indentations 103N extending into such wall. The ridges 102N, as in the case of ridges 102D comprising wall 24D, increase the rigidity of wall 24N in one direction while virtually unaffecting such wall in the transverse direction.

The article-supporting wall 24N, with the addition of end tabs similar to tabs 104D, may be used interchangeably with the article-supporting wall 24D of pan 20D and may be used interchangeably with article-supporting wall 24E of 20E without modification whereupon the resulting pans have been given the general reference numerals 20F and 20G in FIGS. 27 and 28 respectively with the article-supporting wall in each instance being designated by the same reference numeral 24N.

The article-supporting wall 24N of pan 20F will have a pair of end tabs 104N extending from its opposite ends and such tabs are received within associated slots 105F provided in the end walls of the pan. In a similar manner as described in connection with pans 20D and 20E, for example, each article-supporting wall 24N is supported by its columns 82N to define a controlled space between it and the bottom wall of its associated pan whereby space 43F is defined in pan 20F and spaced 43G is defined in pan 20G.

Reference is now made to FIG. 29 of the drawings which illustrates one exemplary embodiment of an apparatus and method which may be utilized to define the article-supporting wall for the improved cooking pan of this invention and such apparatus and method is designated generally by the reference numeral 120. The apparatus 120 comprises a lower die structure 121 which may be suitably supported in a fixed position and an upper die structure 122 which has an upper support 123 provided and a shaft-like portion 124 and portion 124 may be suitably fixed to a vertically movable ram of a standard press, not shown, so that the upper structure 122 may be moved toward and away from the lower structure 121 in a controlled manner.

The apparatus 120 has a pair of cooperating feed and scoring rolls 125 and 126 which are suitably driven in a synchronized manner. The lower roll 125 has a plurality of peripheral grooves 127 provided therein in axially spaced relation and the upper roll 126 has a plurality of peripheral projections 130 extending therefrom and provided therealong in axially spaced relation. Each projection 130 is adapted to be received within an associated groove 127 to define an integral ridge 102N extending from the metal foil layer 21N and a corresponding groove 103N therebeneath. During the feeding of webs into apparatus 120, the rolls 125 and 126 help rotate a supply roll 131 having a web 132 of absorbent material suitably wound thereon simultaneously with another supply roll 133 having a web 134 comprised of aluminum foil laminated or bonded to paperboard. Thus, the rolls 125 and 126 serve as unwinding, combining, scoring, and feed rolls.

The rolls 125 and 126 are operated in an intermittent manner so that the webs 132 and 134 are combined to define a construction 135 which is fed between structures 121 and 122 of the apparatus 120. The operation of the rolls 125 and 126 is controlled by suitable switch means shown as a photoelectric switch device 137 which is fixed adjacent the downstream end of structure 121, see FIG. 30, and the switch 137 is energized once light from an associated source 138 is interrupted by a completed article-supporting wall moving through the apparatus 120.

The apparatus 120 is comprised of an upstream piercing assembly which is designated generally by the reference numeral 140 and a downstream riveting assembly designated generally by the reference numeral 141, see FIGS. 30 and 31. The piercing assembly 140 is comprised of a lower plate 142 which has a plurality of piercing pins 143 each fixed within an associated opening 144 provided therein and the plate 142 is fixed to a lower platen 145 comprising the lower structure 121. Each piercing pin 143 has a conical piercing point 146 which is adapted to pierce through the construction 135.

The piercing assembly 140 has an upper plate 151 fixed to an upper platen 150 of the upper die structure 122. The plate 151 has a plurality of openings 152 extending therethrough with each opening 152 being adapted to receive the conical piercing point 146 and an upper portion of an associated piercing pin 143.

The riveting assembly 141 comprises a plate 153 suitably fixed to the lower platen 145 of structure 121 and a backup plate 154 resiliently supported on a plurality of compression springs 159 attached to the plate 153. The backup plate 154 has a plurality of openings 155 therein which correspond in configuration and arrangement to the openings 152 in the plate 151; however, the openings 155 are larger in diameter than openings 152.

The riveting assembly 141 also has a plate 156 suitably fixed to the upper plate 150 and the plate 156 has a plurality of opening 157 extending therethrough with each opening having a riveting pin 160 inserted therewithin and suitably fixed to the plate 156. Each riveting pin 160 has a substantially conical riveting point 161 and the ratio of the diameter at the base of conical point 161 to the height of the cone is such that a comparatively large flare angle 158, see FIG. 33, is defined. The angle 158 and the diameter of each opening 155 are both controlled to assure an efficient riveting action.

The apparatus 120 has a stripper plate 162 carried in an upwardly spring-loaded manner on compression springs 163, see FIG. 31. The springs 163 are supported concentrically around vertical guide and support pins 164 which have upper portions 164A threadedly received within associated threaded openings in the plate and have lower head portions 164B which limit and control the upper movement of the pins 164 and hence plate 162 so that the top surface of the plate is slightly above the points of the piercing pins 143. The stripper plate 162 serves to strip the construction 135 from around the piercing pins 143 as will be explained in more detail subsequently.

The apparatus 120 also has a cut-off knife 165 carried within a suitable supporting block 166 which is fixed to the plate 150 for vertical movements therewith. The knife 165 has a back-up anvil 167 suitably fixed to the plate 145 between the plates 142 and 153. The anvil 167 is preferably made of an elastomeric material which is not as hard as the cut-off knife 165 so that with repeated engagement of the cutting edge 170 of knife 165 thereagainst such edge will remain sharp for extended operating periods.

To assure that the construction 135, comprised of the combined webs 132 and 134 moves through the apparatus 120 in a smooth manner, the apparatus 120 has a pair of guides 171 provided along opposite sides of the piercing assembly 140. Each guide 171 is fixed to the stripper plate 162 by associated pin 172. The guides 171 have inwardly projecting arms 173 which extend over the construction 135 and prevent excessive upward movement of such construction.

For simplicity, apparatus 120 has been illustrated in FIG. 29 by showing only one typical piercing pin 143 and its associated opening 152 in the piercing pin back-up plate. Similarly, only a single riveting pin 160 has been shown together with its associated opening 155 in the back-up plate 154. However, it will be appreciated that the piercing assembly 140 and the riveting assembly 141 have the detailed construction as illustrated in FIGS. 30 and 31 of the drawings.

To highlight the piercing and riveting action, reference is now made to FIGS. 32 and 33 of the drawings, wherein it will be seen that a typcal piercing pin 143 with its conical piercing point 146 has been extended through the construction 135 to define an opening 174 which gradually tapers away from the metallic foil layer, shown on the bottom in FIG. 32. This opening 174 and integral foil lined column defined thereby are entirely adequate for many applications. However, to provide the column with greater stability and make such column self sufficient in holding the absorbent web 132 in position, the apparatus 120 operates to move the pierced section so that the outer portion of the opening 174 is further opened and flared outwardly by an associated riveting pin 160 with its riveting point or head 161.

During the flaring of each opening 174, the knife 165 cuts the now combined, pierced, and riveted webs 132 and 134 defining construction 135 whereby the improved article spporting wall 24N previously described in detail and illustrated in FIG. 25 of the drawings is finally defined Accordingly, in FIG. 33 the component parts of the article-supporting wall 24N will be given the same reference numerals as in FIG. 26 of the drawings for an easier understanding to such article supporting wall 24N and the method employed to make such wall. Thus, it is seen that each riveting pin 160 with its conical riveting head 161 urges an associated annular edge 113N of the paper layer 22N comprising a part of web 134 against an annular edge 114N of the absorbent layer 110N made from a part of web 132 to define a tubular column 82N having the broad stable base previously described while simultaneously riveting the absorbent layer 110N in position.

To assure that the piercing pins 143 may be more easily withdrawn from within the pierced openings 174 in the construction 135, the outside surface of the metallic foil is preferably coated with a suitable antifriction material which prevents sticking thereof. It has been found that best results are obtained by coating the entire outside surface of the foil with a suitable vinyl coating.

Having described the detailed construction of the cooperating components of the apparatus 120, a brief general description will now be made of the manner in which article-supporting walls 24N may be made in a high production manner. In particular, the rolls 125 and 126 are initially energized until only a short strip of construction 135 extends beyond the cut-off knife 165 whereupon the upper die structure 122 is moved by the associated press into cooperating engagement with the lower die structure 121 causing such short strip to be severed away. Simultaneously with this initial severing, the piercing assembly 140 simultaneously pierces a section of material which will be used to defined an article-supporting wall 24N. The upper die structure 122 is then moved away from its lower die structure 121 whereupon the stripper plate strips the pierced section away from pins 143. The rolls 125 and 126 are then simultaneously energized until the terminal end of the construction 135 actuates the switch device 137 whereupon the feed rolls 125 and 126 are automatically stopped.

The upper die structure 122 is then moved toward the lower die structure 121 causing the holes previously pierced by the piercing pins 143 to be riveted by the riveting pins 160 in the manner previously described and essentially as shown in FIG. 33 of the drawings. During the riveting action by the riveting pins 160, the piercing pins 143 of piercing assembly 140 operate on another upstream section of construction 135 to pierce such upstream section in preparation for subsequent riveting thereof by riveting assembly 141. As the upper die structure 122 is moved downwardly in position causing the simultaneous riveting and piercing action, the knife 165 severs the now pierced and riveted section which is downstream thereof and defines the completed article-supporting wall or absorbent pad 24N.

As the upper die structure 122 is restored to its original upper position, the feed rolls 125 and 126 are again energized whereupon the completed article-supporting wall 24N lying on the plate 154 is pushed from the end of apparatus 120 by the forward edge of construction 135 onto a suitable conveying means or conveyor, not shown, or the completed pad 24N may be grasped manually, removed from the apparatus 120, and placed in a suitable storage container, or the like. The feed and scoring rolls 125 and 126 may be energized manually or automatically and one technique which may be used is to trip an electrical control switch 175 using a control surface 175A on the die structure 122.

The apparatus illustrated in FIGS. 29-31 illustrates a single web 134 which is defined by a web or layer of aluminum foil which has been prelaminated or bonded to a layer or web of paperboard over the major portion of the adjoining surfaces and any suitable adhesive means may be used to bond the foil and paper together. The web 132 may be defined by a plurality of layers of absorbent material and each layer is preferably creped. The layers or sheets definingf web 132 are prelaminated preferably by what may be considered a cold welding action produced by pressing the layer and hence fibers together over substantial surface portions or at spot locations yet without using adhesives, or the like; and the prelaminated layers are suitably wound to define the supply roll 131 so that upon combining webs 132 and 134 the construction 135 is defined. However, it will be appreciated that the metallic foil and paperboard may be provided on separate supply rolls as shown in FIG. 34 wherein a web of aluminum foil 176 is wound on an associated supply roll 177 and a web of paperboard 178 is wound on an associated supply roll 179. Similarly, the web of absorbent material may be defined by a plurality of absorbent layers or webs of a suitable material such as tissue paper 181 each wound on its separate supply roll 182.

Thus, the apparatus 120 upstream of the combining and feed rolls 125 and 126 has been modified to provide separate layers or webs of absorbent material, structural material, and metallic foil. However, the webs downstream of the rolls 125 and 126 upon being combined define a construction which is substantially identical to the construction 135 and, hence, will be given the same reference numeral 135 in FIG. 34. With this approach, the pads 24N may be made more economically in certain applications. Further, the components of the pad or article-supporting wall may be changed more rapidly.

In the apparatus and method 120, the webs 132 and 134 are combined by rolls 125 and 126 which also serve as feed and scoring rolls. Although suitable adhesive means, or the like, may also be employed to attach these webs together, it has been found that the piercing provided by the piercing assembly 140 is all that is necessary to hold the construction 135 together. However, it has been found more desirable to also rivet the layers together in the riveting assembly 141. Thus, the piercing and riveting action provided defines the integral columns 82N, in pad 24N, with their broad stable bases and such columns not only support the pad in a more stable manner while spacing it above an associated bottom wall but also provide the sole means for holding more firmly the layers of foil 21N, structural paper 22N, and absorbent paper 110N together even though layer 110N may be comprised of a plurality of from two to ten individual sheets, and even more, of absorbent material.

Another exemplary embodiment of the apparatus and method of this invention is illustrated in FIG. 35 of the drawings and is designated generally by the reference numeral 185. The apparatus 185 comprises a piercing assembly 186 and a riveting assembly 187 which are suitably driven in a cooperating synchronized manner and provide a piercing and riveting action in a similar manner as the corresponding assemblies 140 and 141 respectively of apparatus 120.

The apparatus 185 is shown operating on two webs of material which are substantially identical to the correspondingly numbered webs shown with apparatus 120 and are comprised of a first web 134 made of metallic foil prelaminated against paperboard and the web 134 is wound on an associated supply roll 133; and a second web 132 of absorbent material wound on an associated supply roll 131. The apparatus 185 has a pair of rolls 195 and 196 which are similar to the rolls 125 and 126 respectively; however, the rolls 195 and 196 serve as combining and scoring rolls while also serving to position the combined webs defining construction 135 so that such construction is wrapped partially around one of the cylinders of the piercing assembly, as indicated at 200, and for a purpose to be explained subsequently. The piercing assembly 186 is comprised of a piercing roll or cylinder 201 having a plurality of piercing pins 202 suitably fixed in spaced relation about its periphery and the piercing cylinder 201 cooperates with a backup roll or cylinder 203 having a plurality of cooperating openings 204 which extend inwardly into the cylinder from its outer periphery. The cylinders 201 and 203 are driven in a synchronized manner so that each piercing pin 202 engages the construction 135 to pierce an opening 174 therein which is substantially identical to the pierced opening 174 illustrated in FIG. 32 and the description of FIG. 32 is substantially fully applicable thereto.

To assure that the piercing action is achieved in an efficient manner by assembly 186, a pair of rollers 206 and 207 are provided in association with cylinder 203 and assure that construction 135 engages the cylinder 203 over a substantial angular arc 209, see FIG. 36. The arc 209 is preferably such that the main circumference 210 of the piercing cylinder 201 is tangent thereto at a location approximately bisecting such arc whereby the construction 135 is in firm contact against the cylinder 203 at location 211 where a particular piercing pin 202 first engages such construction and at location 212 where the same particular piercing pin moves out of engagement with construction 135.

The riveting assembly 187 is operatively connected to the piercing assembly 186 in a synchronized manner and it will be seen that the assembly 187 has a riveting cylinder 214 which has a plurality of spaced riveting pins 215 extending outwardly from its periphery. The riveting cylinder 214 cooperates with a backup cylinder 216 which comprises assembly 187 and has a plurality of openings 217 extending inwardly therein from its outer periphery. Each riveting pin 215 is adapted to cooperate with an associated opening 217 to provide a riveting action substantially identical to the riveting action illustrated and described in connection with FIG. 33 and the apparatus 120.

It will also be seen that the riveting assembly 187 has a plurality of three cutoff knives 220 detachably fixed to cylinder 214 at equally spaced angular increments about its periphery. The backup cylinder 216 has three backup anvils 221 detachably fixed to its periphery and the anvils may be made of any suitable material. The knives 220 cooperate with anvils 221 so that upon operating apparatus 185 causing cylinder 214 to make one complete revolution three article-supporting walls or pads 24N are riveted and severed from tthe apparatus 185.

In the apparatus 185, the cylinders 201 and 203 of the piercing assembly 186 and the cylinders 214 and 216 of the riveting assembly 187 serve as feed rolls pulling the webs 132 and 134 through the entire apparatus 185 whereby pads 24N may be made in a high speed continuous manner. It will also be appreciated that each of the various cylinders, supply rolls, turn rolls, grooving rolls, etc. is suitably supported on an associated shaft in accordance with conventional practice. Further, as previously stated, the assemblies 186 and 187 and hence their cylinders are synchronized using conventional mechanical synchronizing connections indicated schematically by dot-dash lines 222, 223 and 224 to assure efficient operation of the entire assembly 185.

In this disclosure of the invention, the diameter of the cylinders 201, 203, 214 and 216 and placement of knives 220 has been selected so that with each revolution of the cylinders, a plurality of three article-supporting walls 24N are defined; however, it will be appreciated that the diameter of these cylinders may be suitably modified so that with each revolution 1, 2, or more than three article-supporting walls or pads would be defined. Nevertheless, regardless of the number of units 24N provided by each revolution, it will be appreciated that during the piercing action provided by the piercing assembly 186, it is important that the construction 135 be held firmly against the periphery of its associated piercing backup roll over a substantial angular arc, such as arc 209. In addition, the outside surface of the metallic foil layer is also slipcoated with a suitable material such as vinyl to assure easy removal of the piercing pins.

In this presentation, apparatus 120 and 185 have been disclosed particularly in connection with the provision of article-supporting walls or units 24N; however, it is to be understood that each apparatus 120 and 185 may be used to partially or completely define article-supporting walls identical to the walls or pads 24D and 24E of the pans 20D and 20E respectively whereby each of these walls is only comprised of a layer of metallic foil and a layer of structural paperboard. Accordingly, in the instance where units 24D or 24E, for example, are defined it is preferred that a web of metal foil be provided on one supply roll and a web of nonmetallic structural material such as paperboard provided on another supply roll. Each apparatus 120 or 185 would then operate on the associated webs and the piercing and riveting operations provided so that the riveted columns 82D of wall or pad 20D would serve as the sole means holding metal foil layer 21D and paperboard layer 22D together and the riveted columns 28E of wall or pad 20E would serve as the sole means for holding metal foil layer 21E and paperboard layer 22E together.

The apparatus 120, for example, may be suitably modified and the downstream riveting section eliminated to enable provision of pans such as pan 20. Also, apparatus 120 may be modified to pierce and rivet a plurality of pads such as pad 24D, 24E, or 24N in a simultaneous manner. In addition, each apparatus 120 and 185 may be modified by eliminating the riveting section thereof so that separate walls similar to wall 24 of pan 20 may be made using such apparatus.

The power sources, prime movers and related control components for the various components of apparatus 120 and 185 have not been presented herein; however, these items may be readily provided in accordance with conventional practice.

The various exemplary pans presented in this specification are especially useful for broiling in the oven of a conventional range; however, such pans may be used for all types of cooking, including baking, roasting, and the like, where a disposable pan having juice isolation and absorbing means would be desirable. Also, each pan may be used as a container within which a product may be sold and its unique features assure that juices exuding from such product during storage and display are isolated from the product.

While present exemplary embodiments of this invention, and methods of practicing the same, have been illustrated and described, it will be recognized that this invention may be otherwise variously embodied and practiced by those skilled in the art.

What is claimed is:

1. An article-supporting wall for a cooking pan, said wall comprising, a structural layer made of a non-metallic material, a top layer made of metallic foil and being attached against said structural layer, and a plurality of punched openings in said wall which are particularly adapted to allow juice from an article placed on said wall to flow therethrough, said openings having upper portions thereof substantially lined by metallic foil which protects the adjoining structural layer against burning, said openings being surrounded by roughly tubular columns defined by said metallic foil and structural layers during punching with the columns defining integral means adapted to space said article-supporting wall above a bottom wall of said cooking pan and each of said tubular columns having an outwardly flaring bottom portion which prevents its radially inward collapse and defines a larger supporting base therefor, said columns with their larger supporting bases being adapted to space said article-supporting wall above said bottom wall with optimum stability while defining a space therebetween for collecting juice from said article.

2. A wall as set forth in claim 1 in which said structural layer comprises a layer of paperboard and further comprising an absorbent layer attached against the bottom surface of said structural layer.

3. A wall as set forth in claim 2 in which said layer of metallic foil comprises a layer of aluminum foil, said structural layer comprises a layer of paperboard, and said absorbent layer comprises an absorbent layer of tissue paper.

4. A wall as set forth in claim 3 in which said absorbent layer of tissue paper is defined by a plurality of creped sheets of tissue paper.

5. A wall as set forth in claim 1 in which said metallic foil and structural layers are attached together solely by said columns which serve essentially as rivets with the outwardly flaring portions thereof serving as rivet heads.

6. A wall as set forth in claim 2 in which said metallic foil, paperboard, and absorbent layers are attached together by said columns which serve essentially as rivets with the outwardly flaring portions thereof serving as rivet heads, said absorbent layer serving to increase the structural rigidity of said wall.

7. A wall as set forth in claim 2 in which said metallic foil and paperboard layers are laminated together as a unit and said absorbent layer is attached against said paperboard layer by said columns which serve essentially as rivets with the outwardly flaring portions serving as rivet heads.

8. A wall as set forth in claim 7 in which said metallic foil comprises aluminum foil and said absorbent layer comprises a plurality of sheets of absorbent tissue paper.

9. A wall as set forth in claim 1 and further comprising a plurality of ridges extending upwardly from its main planar surface, each of said ridges being defined by indenting the entire thickness of the article-supporting wall to define a corresponding indentation in the bottom portion thereof, said ridges and indentations increasing the strength of said wall and said ridges serving to support portions of said article slightly above said main planar surface.

10. A wall as set forth in claim 2 in which said openings are arranged in parallel rows and further comprising a plurality of parallel ridges extending upwardly from its main planar surface, each of said ridges being arranged between and approximately parallel to an immediately adjacent set of rows and being defined by indenting the entire thickness of the article-supporting wall to define a corresponding indentation in the bottom portion thereof, said ridges and indentations increasing the strength of said wall and said ridges serving to support portions of said article slightly above said main planar surface.

11. A disposable cooking pan comprising; a bottom wall; a peripheral wall foldably connected to the peripheral edge of said bottom wall; and an article-supporting wall supported on said bottom wall, said article-supporting wall comprising, a structural layer made of a non-metallic material, a top layer made of metallic foil and being attached against said structural layer, and a plurality of punched openings in said article-supporting wall which are particularly adapted to allow juice from an article placed thereon to flow therethrough, said openings having upper portions thereof substantially lined by metallic foil which protects the adjoining structural layer against burning, said openings being surrounded by roughly tubular columns defined by said metallic foil and structural layers during punching with the columns defining integral means adapted to space said article-supporting wall above said bottom wall and each of said tubular columns having an outwardly flaring bottom portion which prevents its radially inward collapse and defines a larger supporting base therefor, said columns with their larger supporting bases being adapted to space said article-supporting wall above said bottom wall with optimum stability while defining a space therebetween for collecting juice from said article.

12. A pan as set forth in claim 11 in which said layer of metallic foil comprises a layer of metallic foil containing aluminum and said structural layer comprises a layer of paperboard having high strength when wet.

13. A pan as set forth in claim 11 in which said structural layer comprises a layer of paperboard and further comprising an absorbent layer attached against the bottom surface of said structural layer.

14. A pan as set forth in claim 11 in which said bottom wall and said peripheral wall are made from a single sheet of foldable material and said peripheral wall is folded flatly against the top surface of said article-supporting wall during shipment and storage and is easily lifted substantially vertically when it is desired to use said pan for cooking.

15. A pan as set forth in claim 14 in which said single sheet of foldable material comprises a sheet of metallic foil.

References Cited
UNITED STATES PATENTS

| | | | |
|---|---|---|---|
| 2,752,279 | 6/1956 | Alderfer | 161—111 |
| 3,415,662 | 12/1968 | Koger et al. | 99—446 UX |
| 3,453,949 | 7/1969 | Levin | 99—446 |
| 3,515,331 | 6/1970 | Guthrie | 229—3.5 MF X |
| 3,613,554 | 10/1971 | Koger et al. | 99—446 |

PETER FELDMAN, Primary Examiner

A. O. HENDERSON, Assistant Examiner